United States Patent [19]

Nishiyama et al.

[11] Patent Number: 4,937,030
[45] Date of Patent: Jun. 26, 1990

[54] METHOD OF FABRICATING A SLUSH MOLD AND SKIN MADE THEREFROM

[75] Inventors: Takashi Nishiyama, Komaki; Shuichi Yokota, Aichi; Masaru Takino, Kakamigahara; Hiroaki Asakura, Inuyama; Junichiro Iseki, Komaki, all of Japan

[73] Assignee: Mitusboshi Belting Ltd., Kobi, Japan

[21] Appl. No.: 388,686

[22] Filed: Aug. 2, 1989

Related U.S. Application Data

[63] Continuation of Ser. No. 75,138, Jul. 20, 1987, abandoned.

[30] Foreign Application Priority Data

Jul. 21, 1986 [JP] Japan ............................. 61-172343

[51] Int. Cl.⁵ ............................................. B29C 41/18
[52] U.S. Cl. ..................................... 264/162; 264/1.3; 264/219; 264/226; 264/227; 264/302
[58] Field of Search ............... 264/219, 225, 226, 227, 264/162, 302, 303, 1.3; 249/55

[56] References Cited

U.S. PATENT DOCUMENTS

| | | | |
|---|---|---|---|
| 2,435,643 | 2/1948 | Bean | 264/227 |
| 2,895,206 | 7/1959 | Hemphill | 249/55 |
| 3,428,725 | 2/1969 | Delmonte | 264/227 |
| 3,562,049 | 2/1971 | Maher | 264/227 |
| 3,565,978 | 2/1971 | Folger | 264/227 |
| 3,979,487 | 9/1976 | Seuier | 264/129 |
| 4,217,325 | 8/1980 | Colby | 264/255 |
| 4,466,936 | 8/1984 | Schapel | 264/225 |
| 4,500,373 | 2/1985 | Kubota | 264/48 |
| 4,714,424 | 12/1987 | Kinugasa | 249/55 |
| 4,716,003 | 12/1987 | Gaudreau | 425/435 |

Primary Examiner—Jay H. Woo
Assistant Examiner—Jeremiah F. Durkin, II
Attorney, Agent, or Firm—Wood, Phillips, Mason, Recktenwald & VanSanten

[57] ABSTRACT

A method of forming a slush mold and a synthetic resin skin utilizing the slush mold. The method includes the steps of roughing a foamed synthetic resin surface to define a prototype having a plurality of irregularly spaced and irregularly sized recesses, forming a metal mold to have a molding surface accurately complementary to the prototype surface and molding a skin of synthetic resin against the molding surface of the metal mold. The recesses preferably have a cross section dimension in the range of approximately 170 to 500 microns and a depth in the range of approximately 8 to 133 microns. Narrower preferred ranges are disclosed. The surface preferably has a regular unbiased variance of less than approximately 300 microns and preferably less than 200 microns.

33 Claims, 2 Drawing Sheets

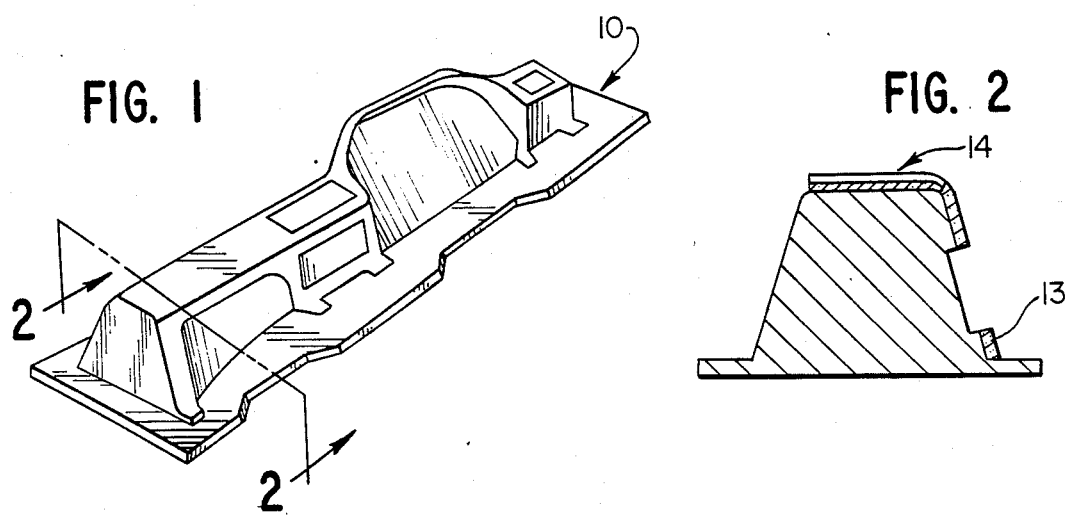
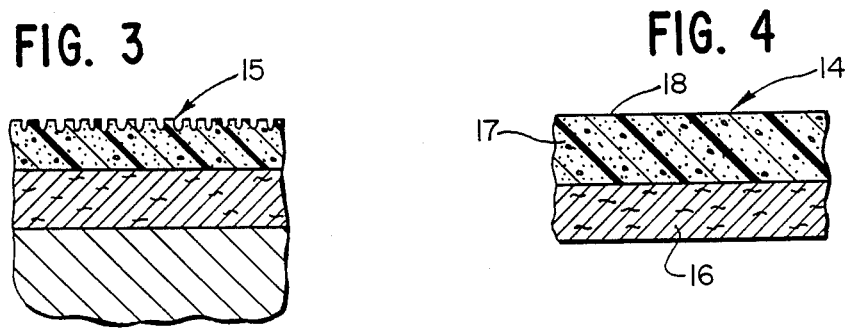
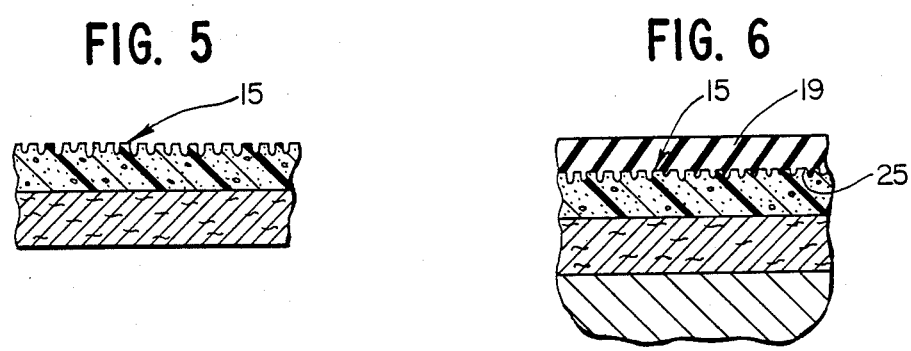

4,937,030

METHOD OF FABRICATING A SLUSH MOLD AND SKIN MADE THEREFROM

CROSS REFERENCE

This is a continuation of application Ser. No. 075,138 filed Jul. 20, 1987 now abandoned.

This invention relates to molding of synthetic resins and the like and in particular to the manufacture of a slush mold and a synthetic resin skin formed by use thereof.

BACKGROUND ART

In one conventional form of molding, a settable material is flowed against a slush mold surface which is suitably cooled so as to effect a setting of a portion of the molding material against the surface, whereupon the liquid material is removed, leaving the formed set synthetic resin body having a surface accurately conforming to the surface of the slush mold.

Such slush molding technique has been utilized in forming a wide range of synthetic resin objects, including automobile dashboard surfaces A problem has arisen, however, in the use of the conventional slush molded dashboard surface elements, conventionally referred to as skins, in that such conventional skins tend to reflect on the front windshield of the automobile, causing difficulty in seeing through the windshield in the normal use of the automobile The conventional dashboard skin is provided with a leatherlike or jacquard pattern Notwithstanding the provision of the pattern, the highly undesirable reflection of light from the dashboard skin against the windshield has caused the serious and vexatious problem of interfering with the driver's vision. As such interference is dangerous, it has long been a desideratum, in such applications, to eliminate such glare. Heretofore, no completely satisfactory solution to this problem has been realized One attempted solution has been to coat the upper surface of the skin with a special paint, forming an uneven surface.

Another attempted solution has been to flatten the upper surface Still another attempt to solve this vexatious problem has been to flock the surface. None of these attempts, as discussed above, has proven completely satisfactory and have the further defect of requiring separate additional steps in the forming of the skin so as to substantially increase the cost thereof.

DISCLOSURE OF INVENTION

The present invention comprehends an improved method of forming such a skin which has been found to have a substantial reduction in the reflection of light therefrom in such a manner as to effectively eliminate the glare on the windshield when such a skin is utilized as a dashboard cover skin.

The method of forming such a skin of the present invention eliminates the need for subsequent expensive treatment of the molded skin surface by incorporating into the surface a configuration effectively functioning to minimize such reflective glare.

More specifically, the invention comprehends the provision of an improved molding technique wherein a slush mold is formed having a molding surface provided with a plurality of irregularly spaced and irregularly sized recesses.

The skin molded by means of the improved slush mold means provides an improved antireflective nonglare surface and is advantageously adapted for such uses as an automobile dashboard skin. Additionally, the skin formed by the method of the present invention may be utilized in many other applications as the skin provides a highly attractive and decorative surface.

In forming the slush mold of the present invention, a prototype surface is formed on a foamed synthetic resin body, the prototype surface having a plurality of regularly spaced and regularly sized recesses A metal slush mold is then formed by subsequent steps to have a molding surface accurately complementary to the prototype surface, whereupon molding of a synthetic resin against the molding surface provides a synthetic resin skin having a rough surface corresponding to the prototype surface and exhibiting the highly desirable low glare, low reflectivity effect discussed above.

More specifically, the invention comprehends a method of forming a synthetic resin skin by the steps of forming a prototype having a rough first surface, forming a reverse mold having a complementary second rough surface by setting a first moldable material against the first surface, forming a mandrel having a complementary rough third surface by setting a second moldable material against the second surface, forming a metal plate on the third surface, separating the metal plate from the third surface, the surface of the mold plate formed against the third surface comprising a rough fourth surface complementary to the first surface; molding a synthetic resin skin against the fourth surface, and removing the skin from the fourth surface, the surface of the skin formed against the fourth surface comprising a fifth surface corresponding to the rough first surface.

The prototype, in the illustrated invention, comprises a layer of foamed synthetic resin defining the first surface.

The first surface is formed by roughening the surface of the foamed synthetic resin as with a leather watermarking machine.

The rough surface defines a plurality of distributed recesses having a cross section in the range of approximately 170 to 500 microns and a depth in the range of approximately 8 to 133 microns.

The recesses preferably have a regular unibiased variance in the lateral distances between the centerlines of the recesses of less than approximately 300 microns.

The invention comprehends the forming of such a mold for use in producing molded elements having such a desirable surface characteristic. As indicated above, the objects molded by means of the improved mold are advantageously adapted for a wide range of applications, including dashboard skin applications more specifically discussed above.

The mold formed in accordance with the invention is advantageously adapted for slush molding of synthetic resin skins so as to define the highly desirable surface characteristics without the need for further processing steps.

The method of forming a mold and synthetic resin objects molded by means of the improved mold are extremely simple and economical, while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a prototype arranged for use in carrying out the novel method of the invention;

FIG. 2 is a transverse section taken substantially along the line 2—2 of FIG. 1;

FIG. 3 is a fragmentary enlarged vertical section illustrating the prototype surface in greater detail;

FIG. 4 is a fragmentary section illustrating the arrangement of the prototype surface portion prior to the provision of the roughened surface therein;

FIG. 5 is a fragmentary section illustrating the prototype surface portion;

FIG. 6 is a section illustrating the forming of a reverse mold having a surface complementary to the roughened surface of the prototype;

BEST MODE FOR CARRYING OUT THE INVENTION

Figure 7:
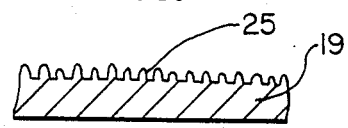
FIG. 7 is a cross section illustrating the cured reverse mold.
Figure 8:
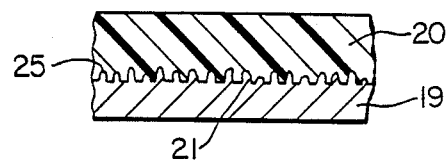
FIG. 8 is a section illustrating the further step of forming a mandrel by molding thereof against the surface of the reverse mold.
Figure 9:
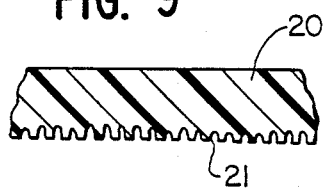
FIG. 9 is a section of the formed mandrel.
Figure 10:
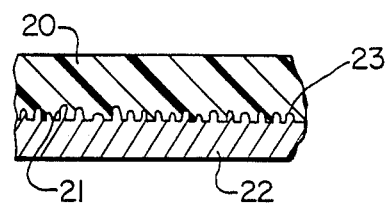
FIG. 10 is a section illustrating the provision of a metal plate on the surface of the mandrel.
Figure 11:
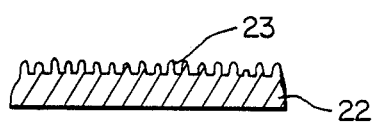
FIG. 11 is a section of the metal plate removed from the surface of the mandrel and defining a molding surface.
Figure 12:
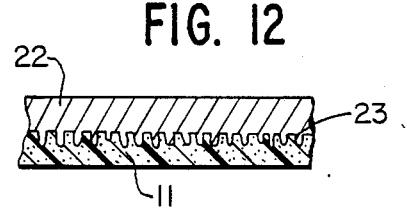
FIG. 12 is a fragmentary cross section illustrating the slush molding of a skin against the molding surface of the metal plate mold of FIG. 11.

In the illustrative embodiment of the invention as disclosed in the drawing, a prototype generally designated 10 illustratively comprises a dashboard for an automobile. As indicated above, it is desirable, in such an application as a dashboard, to provide a nonreflective surface on the dashboard. The present invention is concerned with the provision of a skin 11 (FIG. 13) having a rough exposed surface 12 which eliminates the undesirable glare and light reflection of the prior art dashboard surfaces.

More specifically, prototype 10 may be provided on a front surface, with a leather portion 13. The upper portions generally designated 14 of the prototype is formed in a unique manner to define a nonglare, nonreflective prototype surface generally designated 15, as shown in FIG. 3.

More specifically, the upper prototype portion 14 is formed of a laminate of a solid layer 16 and a foamed synthetic resin layer 17. The upper surface 18 of the foam layer 17 is roughened as by treatment with a leather watermarking machine so as to define the desired irregular surface 15 of the prototype.

In the illustrated embodiment, the solid layer 16 comprises a layer having a thickness approximately 0.3 to 2 millimeters. The layer 16 may be formed of a suitable synthetic resin, such as vinyl chloride, ABS, urethane, etc. The foamed layer 17 has a thickness approximately 0.3 to 2 millimeters and may be formed of any suitable foam, such as polyurethane foam.

Figure 14:
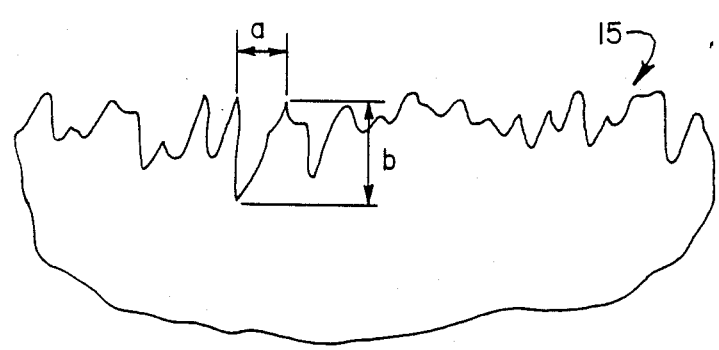
FIG. 14 is a fragmentary enlarged section illustrating in greater detail the rough surface of the prototype and skin of the present invention.

The working of the foam surface 18 to define the roughened surface 15 of the prototype is carried out to define the irregular surface illustrated in FIG. 14. The prototype surface 15 thusly is defined by a plurality of recesses having a cross section in the range of approximately 170 to 500 microns and a depth in the range of approximately 8 to 133 microns. A more preferred range of the cross section is approximately 300 to 400 microns, and a more preferred range of the depth of the recesses is approximately 500 to 100 microns. The most preferred range of the cross section is 320 to 370 microns, and the most preferred range of the depth is approximately 60 to 80 microns.

The unbiased variance W(a) of the spacing between the centerlines of the recesses is approximately 300 microns, or smaller, so as to provide the desired low reflectivity effect. More preferably, the unbiased variance W(a) is 200 microns or less.

The unbiased variance W(a) is determined by the formula:

$$W(a)^2 = $$

$$\frac{(W(1) - W(x))^2 + (W(2) - W(x))^2 \ldots + (W(n) - W(x))^2}{n - 1} =$$

$$\frac{1}{n-1} \left[ \Sigma x_i^2 - \frac{(\Sigma X_i)^2}{n} \right] W(a) =$$

$$\sqrt{W(a)^2} \text{ where } W(x) \text{ is the distance}$$

between the centerlines of the recesses of the average value of $$W(x) = \frac{\Sigma W(x)}{n}$$

where n is a preselected number of measurements.

It has been found that an improved surface configuration is provided by minimizing W(a). More specifically, the improved antiglare effect is enhanced when the unevenness exists regularly at a uniform interval on the surface as compared to one where the uneven surface is formed by recesses distributed at random therein.

The invention comprehends forming a reverse mold 19 by setting a molding synthetic resin, such as RTV rubber, on the surface 15, as shown in FIG. 6. The reverse mold 19 is removed from association with the surface 15 after the resin is cured. A mandrel 20 is formed by setting a synthetic resin, such as epoxy, urethane, etc., against the surface 25 of the reverse mold 19. The mandrel resultingly defines a rough surface 21 which corresponds to surface 15 of the prototype.

Metal is now deposited against the mandrel surface 21 to define a metal plate 22 having a surface 23 complementary to the mandrel surface 21. Illustratively, the metal plate is formed by firstly depositing silver on the surface 21 and then electrodepositing nickel by dipping the structure in a sulfomate bath utilizing a nickel electrode. A current density of 1 to 6 amps per $cm^2$ is provided to precipitate the nickelplate 22 on the mandrel surface 21.

| Nickel Sulfate Bath Composition | |
|---|---|
| Material | Concentration |
| $Ni(SO_3NH_4) \cdot 4H_2O$ | 400 g/liter |
| $H_3Bo_3$ | 30 g/liter |

-continued

| Nickel Sulfate Bath Composition | |
|---|---|
| Material | Concentration |
| Surfactant | 0.5 g/liter |

Upon completion of the forming of the metal plate 22, the plate is removed from association with the mandrel, thereby leaving exposed the surface 23 of the plate, which is complementary to the prototype surface 15.

Figure 13:
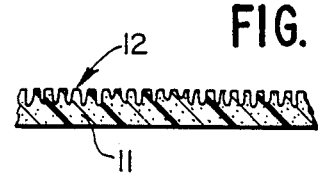
FIG. 13 is a fragmentary section of the molded skin.

As discussed above, skin 11 is formed of a suitable synthetic resin, such as polyvinyl chloride, ABS, etc., by slush molding of the resin against the mold defined by the metal plate 22. The slush molding technique is well known by those skilled in the art and requires no further description herein. The resultant skin 11, illustrated in FIG. 13, is removed from association with the metal plate 22 and thereby forms the desired synthetic resin skin having the highly desirable surface characteristics discussed above in the provision of the surface 12 thereof corresponding accurately to the prototype surface 15 discussed above. Thus, the skin surface has the same dimensional characteristics as the prototype surface and the same, unbiased variance W(a) as the prototype surface, thereby providing the highly desirable low reflectance antiglare desired skin surface characteristics.

A skin manufactured in accordance with the disclosed method was utilized on the dash panel of a Nissan Leopard automobile 1984 model and compared with skins of the prior art. The skin manufactured in accordance with the invention proved substantially superior in the antiglare, low reflection characteristics.

More specifically, it was found that where the unbiased variance was 200 microns or smaller, the reflection on the windshield was not observable by the driver. In the range of W(a) 200 to 300 microns, the reflection was slightly observed, and when the W(a) was in the range of 300 to 350 microns, the reflection was clearly observed. Thus, the skin manufactured in accordance with the method of the invention, utilizing a W(a) of less than 300 microns, provides a substantially improved skin surface for use in applications, such as in the dashboard of an automobile where a low reflectance, low glare surface is desired.

While the invention is advantageously adapted for use in such applications where low glare is desired, the skin fabricated by the method of the invention has a highly aesthetic appearance simulating leather and, thus, the skin may be utilized in a wide range of applications as well, without regard to the low reflectance characteristics thereof.

The invention comprehends both the method of forming the skin and the method of forming a slush mold for use in forming the improved skin. The slush mold is provided with an irregular, or rough, surface having a unbiased variance of less than 300 microns and preferably less than 200 microns, as discussed above.

The foregoing disclosure of specific embodiments is illustrative of the broad inventive concepts comprehended by the invention.

We claim:

1. The method of forming a synthetic skin comprising the steps of:
   providing a skin;
   forming a mold to have a molding surface having irregularly spaced, irregularly sized recesses; and
   producing a surface with recesses therein arranged such that the unbiased variance for the spacing between the recesses on the skin is less than 300 microns by molding the skin against said molding surface.

2. The method of forming a synthetic resin skin of claim 1 wherein said prototype surface defines a plurality of distributed recesses having a cross section in the range of approximately 170 to 500 microns and a depth in the range of approximately 8 to 133 microns.

3. The method of forming a synthetic resin skin of claim 1 wherein said prototype surface defines a plurality of distributed recesses having a regular unbiased variance in the lateral distances between the centerlines of said recesses, said variance being less than approximately 200 microns.

4. The method of forming a synthetic resin skin of claim 1 wherein said step of molding said skin against said molding surface comprises a step of slush molding.

5. The method of forming a synthetic resin skin comprising the steps of:
   forming a prototype having a first surface with a plurality of distributed recesses therein;
   forming a reverse mold having a complementary second surface by setting a first moldable material against said first surface;
   forming a mandrel having a complementary third surface by setting a second moldable material against said second surface;
   forming a metal plate on said third surface;
   separating said metal plate from said third surface, the surface of said metal plate formed against said third surface comprising a fourth surface complementary to said first surface;
   molding a synthetic resin skin against said fourth surface and producing a fifth surface on said skin with recesses therein arranged such that the unbiased variance of the spacing for the recesses on the fifth surface is less than 300 microns; and
   removing said skin from said fourth surface, the surface of said skin formed against said fourth surface.

6. The method of forming a synthetic resin skin of claim 5 wherein said prototype comprises a layer of foamed synthetic resin defining said first surface;

7. The method of forming a synthetic resin skin of claim 5 wherein said prototype comprises a layer of foamed synthetic resin defining said first surface, said first surface being formed by roughing said first surface.

8. The method of forming a synthetic resin skin of claim 5 wherein said prototype comprises a layer of foamed synthetic resin defining said first surface, said first surface being formed by roughing said first surface with a leather watermarking means.

9. The method of forming a synthetic resin skin of claim 5 wherein said first surface defines a plurality of distributed recesses having a cross section in the range of approximately 170 to 500 microns.

10. The method of forming a synthetic resin skin of claim 5 wherein said first surface defines a plurality of distributed recesses having a depth in the range of approximately 8 to 133 microns.

11. The method of forming a synthetic resin skin of claim 5 wherein said first surface defines a plurality of distributed recesses having a cross section in the range of approximately 300 to 400 microns.

12. The method of forming a synthetic resin skin of claim 5 wherein said first surface defines a plurality of distributed recesses having a depth in the range of approximately 50 to 100 microns.

13. The method of forming a synthetic resin skin of claim 5 wherein said first surface defines a plurality of distributed recesses having a cross section in the range of approximately 320 to 370 microns.

14. The method of forming a synthetic resin skin of claim 5 wherein said first surface defines a plurality of distributed recesses having a depth in the range of approximately 60 to 80 microns.

15. The method of forming a synthetic resin skin of claim 5 wherein said first surface defines a plurality of distributed recesses having a regular unbiased variance in the lateral distances between the centerlines of said recesses, said variance being less than approximately 200 microns.

16. The method of forming a synthetic resin skin of claim 5 wherein said prototype comprises an automobile dashboard 17. The method of forming a synthetic resin skin of claim 5 wherein said first moldable material comprises a synthetic resin.

18. The method of forming a synthetic resin skin of claim 5 wherein said second moldable material comprises a synthetic resin.

19. The method of forming a synthetic resin skin of claim 5 wherein said step of forming a metal plate on said third surface comprises a step of electroplating metal on said third surface.

20. The method of forming a synthetic resin skin of claim 5 wherein said step of forming a metal plate on said third surface comprises a step of electroplating nickel on said third surface.

21. The method of forming a synthetic resin skin of claim 5 wherein said step of molding said skin against said fourth surface comprises a step of slush molding.

22. The method of forming a slush mold, comprising the steps of:
   forming a prototype having a rough first surface with a plurality of distributed recesses having an unbiased variance of the spacing between the centerlines of the recesses of no more than 300 microns.
   forming a reverse mold having a complementary second rough surface by setting a first moldable material against said first surface;
   forming a mandrel having a complementary rough third surface by setting a second moldable material against said second surface;
   forming a metal plate on said third surface; and
   separating said metal plate from said third surface, the surface of said metal plate formed against said third surface comprising as fourth surface complementary to said first surface.

23. The method of forming a slush mold of claim 22 wherein said prototype comprises a layer of foamed synthetic resin defining said first surface.

24. The method of forming a slush mold of claim 22 wherein said prototype comprises a layer of foamed synthetic resin defining said first surface, said first surface being formed by roughening said first surface.

25. The method of forming a slush mold of claim 22 wherein said prototype comprises a layer of foamed synthetic resin defining said first surface, said first surface being formed by roughening said first surface with a leather watermarking means.

26. The method of forming a slush mold of claim 22 wherein said first surface defines a plurality of distributed recesses having a cross section in the range of approximately 170 to 500 microns.

27. The method of forming a slush mold of claim 22 wherein said first surface defines a plurality of distributed recesses having a depth in the range of approximately 8 to 133 microns.

28. The method of forming a slush mold of claim 22 wherein said first surface defines a plurality of distributed recesses having a cross section in the range of approximately 300 to 400 microns.

29. The method of forming a slush mold of claim 22 wherein said first surface defines a plurality of distributed recesses having a depth in the range of approximately 50 to 100 microns.

30. The method of forming a slush mold of claim 22 wherein said first surface defines a plurality of distributed recesses having a cross section in the range of approximately 320 to 370 microns.

31. The method of forming a slush mold of claim 22 said first surface defines a plurality of distributed recesses having a depth in the range of approximately 60 to 80 microns.

32. The method of forming a slush mold of claim 22 wherein said first surface defines a plurality of distributed recesses having a regular unbiased variance in the lateral distances between the centerlines of said recesses, said variance being less than approximately 200 microns.

33. The method of forming a slush mold of claim 22 wherein said prototype comprises an automobile dashboard.

* * * * *